US012710796B2

(12) United States Patent
Chang et al.

(10) Patent No.: US 12,710,796 B2
(45) Date of Patent: Aug. 18, 2026

(54) WIRE MANAGEMENT STRUCTURE AND ELECTRONIC DEVICE

(71) Applicant: PEGATRON CORPORATION, Taipei City (TW)

(72) Inventors: Yu-Chuan Chang, Taipei City (TW); Ching-Sung Yeh, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 105 days.

(21) Appl. No.: 18/931,427

(22) Filed: Oct. 30, 2024

(65) Prior Publication Data

US 2025/0238058 A1 Jul. 24, 2025

(30) Foreign Application Priority Data

Jan. 22, 2024 (TW) ................................ 113200790

(51) Int. Cl.
*G06F 1/16* (2006.01)

(52) U.S. Cl.
CPC ................................. *G06F 1/1683* (2013.01)

(58) Field of Classification Search
None
See application file for complete search history.

(56) References Cited

U.S. PATENT DOCUMENTS 7,628,644 B1 12/2009 Peluffo et al.
8,353,485 B2 * 1/2013 Hjerpe .................... F16L 3/222 248/74.1
8,737,797 B2 * 5/2014 Kubinski ............. G02B 6/3897 385/139
8,801,324 B2 * 8/2014 Kempf .................. H02G 11/00 403/339
9,556,972 B2 * 1/2017 White .................... H04Q 1/131
9,853,434 B2 * 12/2017 Vaccaro ................ F16B 21/086
10,109,960 B2 * 10/2018 Casses ..................... G01K 1/14
11,662,041 B2 * 5/2023 Laughlin ................ F16L 3/237 248/68.1
2002/0131750 A1 * 9/2002 Holman ............. G02B 6/44524 385/136

FOREIGN PATENT DOCUMENTS

CN 202424039 U 9/2012
TW I811105 B 8/2023

* cited by examiner

*Primary Examiner* — Xanthia C Relford
(74) *Attorney, Agent, or Firm* — MUNCY, GEISSLER, OLDS & LOWE, P.C.

(57) ABSTRACT

A wire management structure and an electronic device. The wire management structure is suitable to fix a plurality of wires. The wire management structure includes a main body and a plurality of guide members. The main body includes a first side wall, a second side wall and a third side wall, and the second side wall is connected to the first side wall and the third side wall. The guide members are correspondingly disposed at the first side wall, the second side wall and the third side wall of the main body. A plurality of wire management slots are formed between the guide members and the first side wall, the second side wall and the third side wall, and the wires are suitable to pass through the wire management slots.

17 Claims, 6 Drawing Sheets

WIRE MANAGEMENT STRUCTURE AND ELECTRONIC DEVICE

CROSS REFERENCE TO RELATED APPLICATIONS

This Non-provisional application claims priority under 35 U.S.C. § 119(a) on Patent Application No(s). 113200790 filed in Taiwan, Republic of China on Jan. 22, 2024, the entire contents of which are hereby incorporated by reference.

BACKGROUND

Technology Field

The present disclosure relates to a structure and a device, and in particular, to a wire management structure for managing and fixing wires and an electronic device with the wire management structure.

Description of Related Art

In the existing electronic devices, such as notebook computers, hooks and partitions as well as auxiliary materials (e.g. sponges) are generally designed inside the housing to restrict the positions of internal wires. However, current notebook computers are designed much thinner, and there are more and more types of antennas, such as Wifi, 4G LTE and/or 5G antennas, to be configured in the notebook computers. The wires of these antennas occupy the space of the hinge structure, which leads to insufficient space for wire management inside the notebook computers. For example, the hooks, partitions and other related structures to organize these wires may not be formed by molding. In addition, since there is no appropriate space for wire management, it may not meet the safety regulations (Gap<1 mm) to cause safety problems.

SUMMARY

In view of the foregoing, the present disclosure is to provide a wire management structure and an electronic device that can not only prevent internal wires from crossing, stacking or incorrect wire management, but also comply with safety regulations.

A wire management structure of this disclosure, which is suitable to fix a plurality of wires, includes a main body and a plurality of guide members. The main body includes a first side wall, a second side wall and a third side wall, and the second side wall is connected to the first side wall and the third side wall. The guide members are correspondingly disposed at the first side wall, the second side wall and the third side wall of the main body. A plurality of wire management slots are formed between the guide members and the first side wall, the second side wall and the third side wall, respectively, and the wires are suitable to pass through the wire management slots.

An electronic device of this disclosure includes a housing, a plurality of wires and a wire management structure. The wire management structure is configured to fix the wires, and includes a main body and a plurality of guide members. The main body is disposed at the housing and includes a first side wall, a second side wall and a third side wall. The second side wall is connected to the first side wall and the third side wall. The guide members are correspondingly disposed at the first side wall, the second side wall and the third side wall of the main body. A plurality of wire management slots are formed between the guide members and the first side wall, the second side wall and the third side wall, respectively, and the wires are suitable to pass through the wire management slots.

As mentioned above, in the wire management structure and the electronic device of this disclosure, the main body of the wire management structure is disposed at the housing of the electronic device and includes a first side wall, a second side wall and a third side wall. The guide members are correspondingly disposed at the first side wall, the second side wall and the third side wall of the main body, respectively. A plurality of wire management slots can be formed between the guide members and the first side wall, the second side wall and the third side wall, respectively, and the wires are suitable to pass through the wire management slots. Based on the structural design, the wire management structure and electronic device of this disclosure can not only prevent the undesired crossing and stacking of internal wires or incorrect wire management, but also comply with safety regulations.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
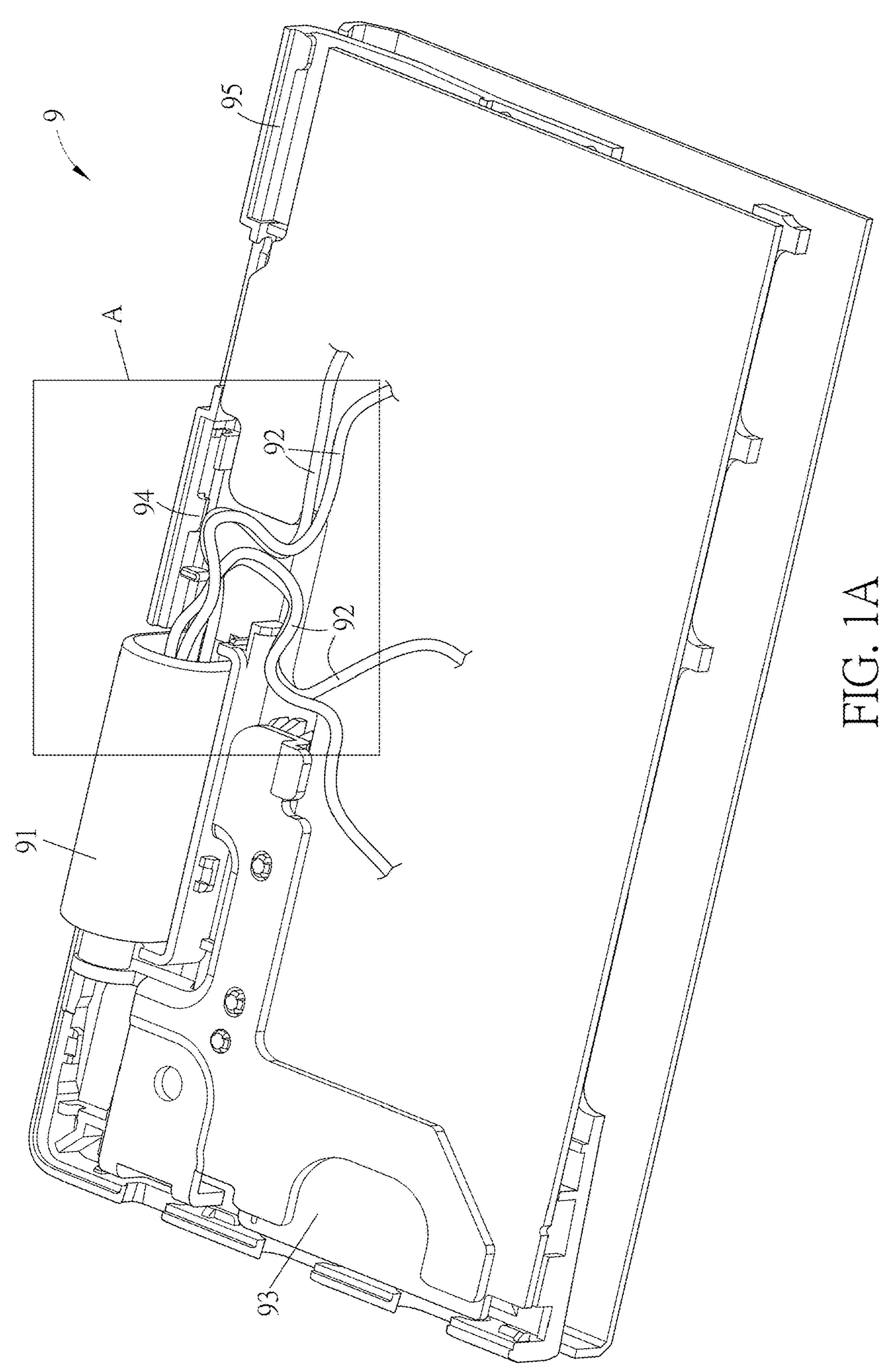
FIG. 1A is a schematic diagram showing a partial internal structure of an electronic device.
Figure 1B:
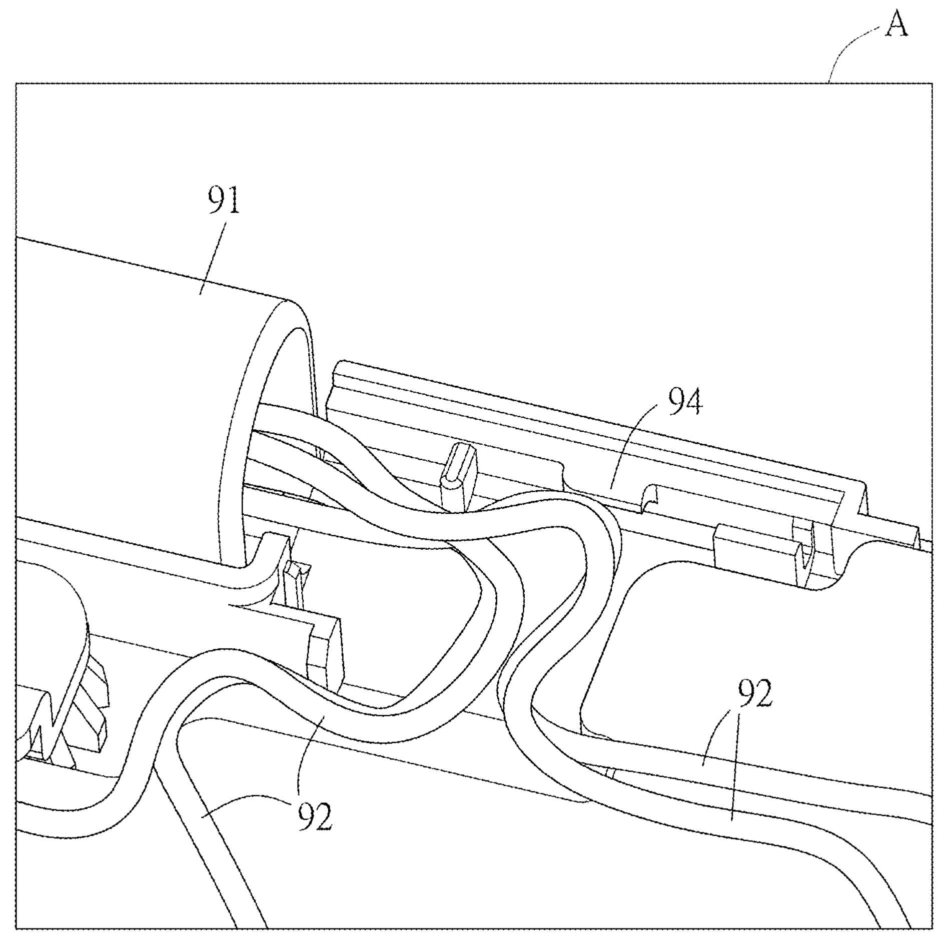
FIG. 1B is an enlarged view of the region A as shown in FIG. 1A.
Figure 2A:
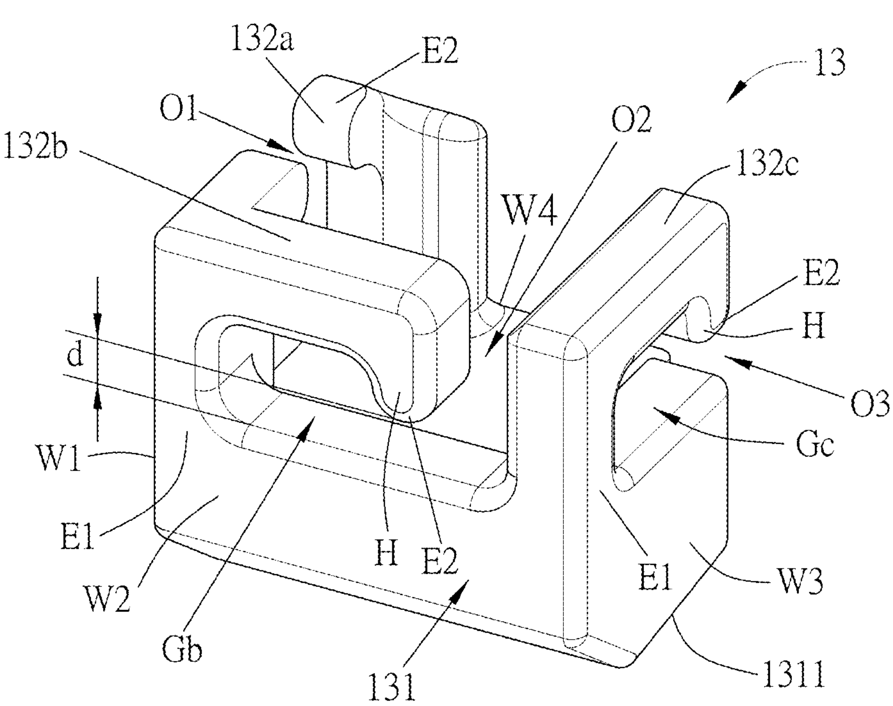
FIG. 2A and FIG. 2B are schematic diagrams showing the wire management structure according to an embodiment of this disclosure in different viewing angles.
Figure 2B:
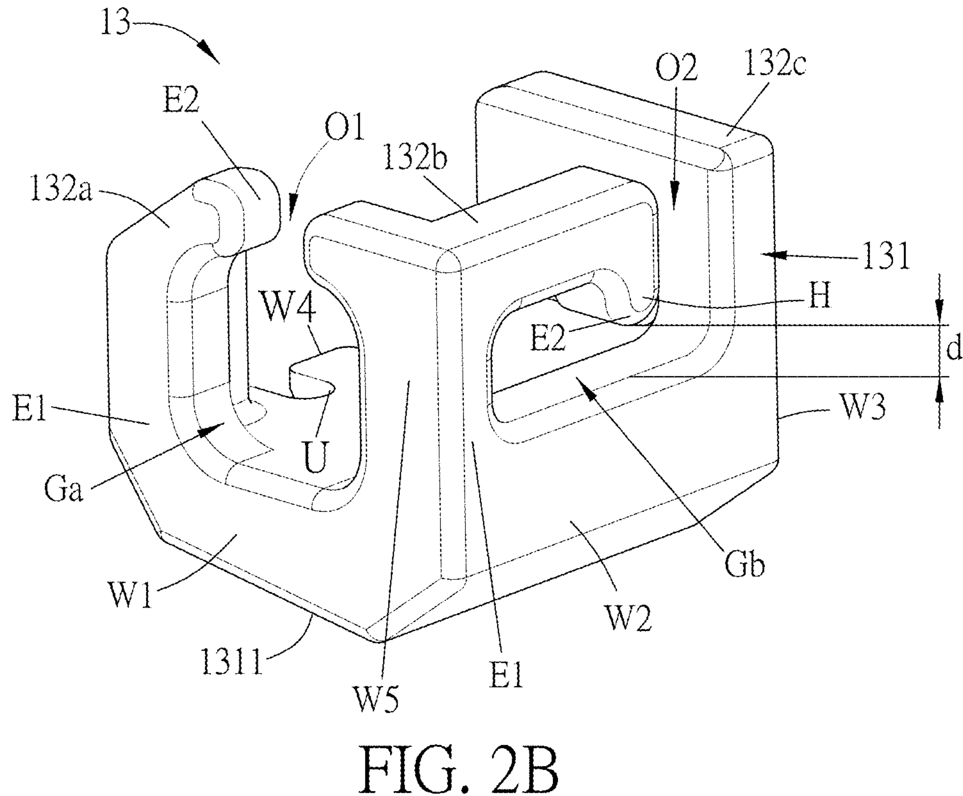
Figure 3A:
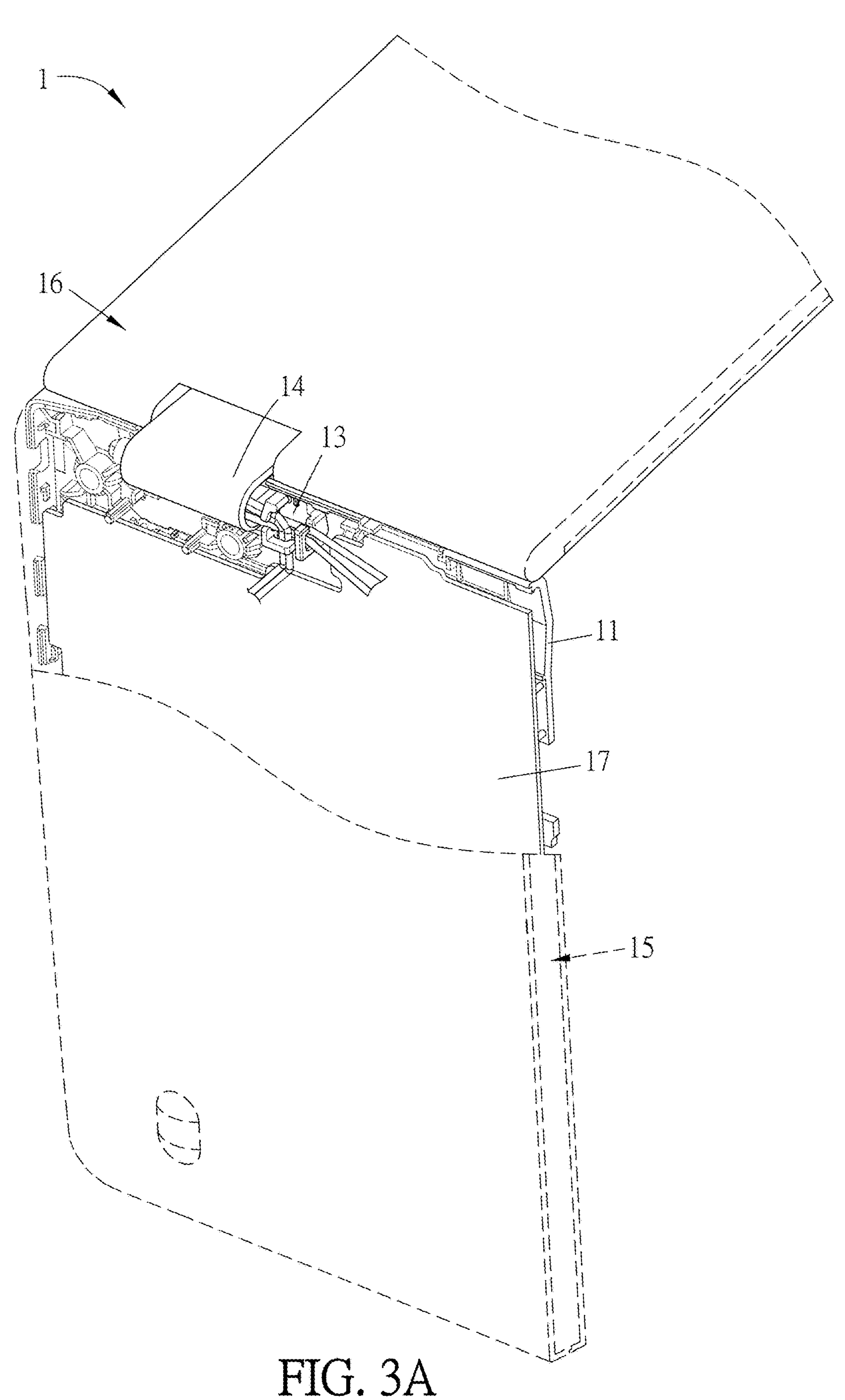
FIG. 3A is a schematic diagram showing a partial internal structure of an electronic device according to an embodiment of this disclosure.
Figure 3B:
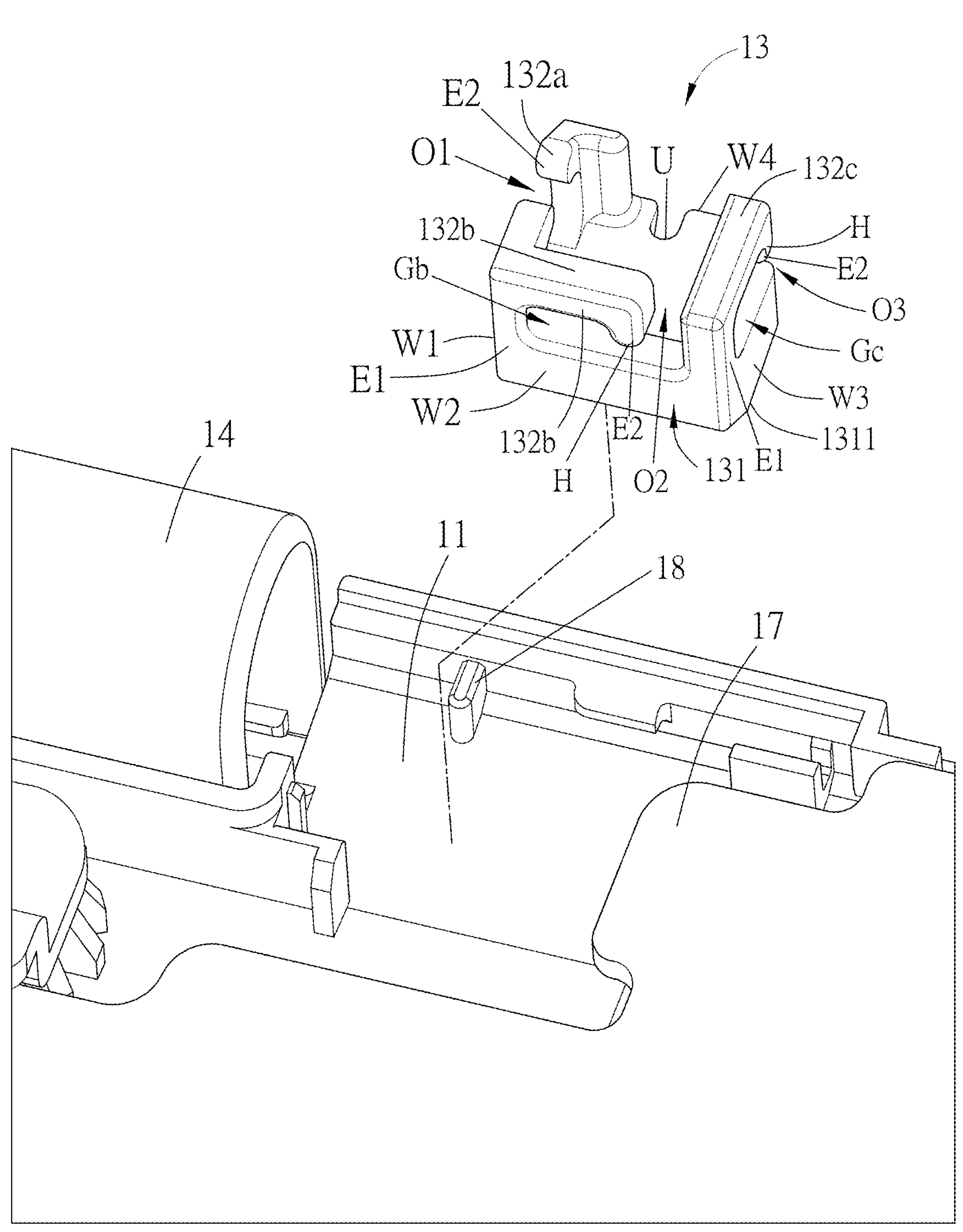
FIG. 3B is a schematic diagram showing that the wire management structure of FIG. 2A is disposed inside the electronic device.
Figure 3C:
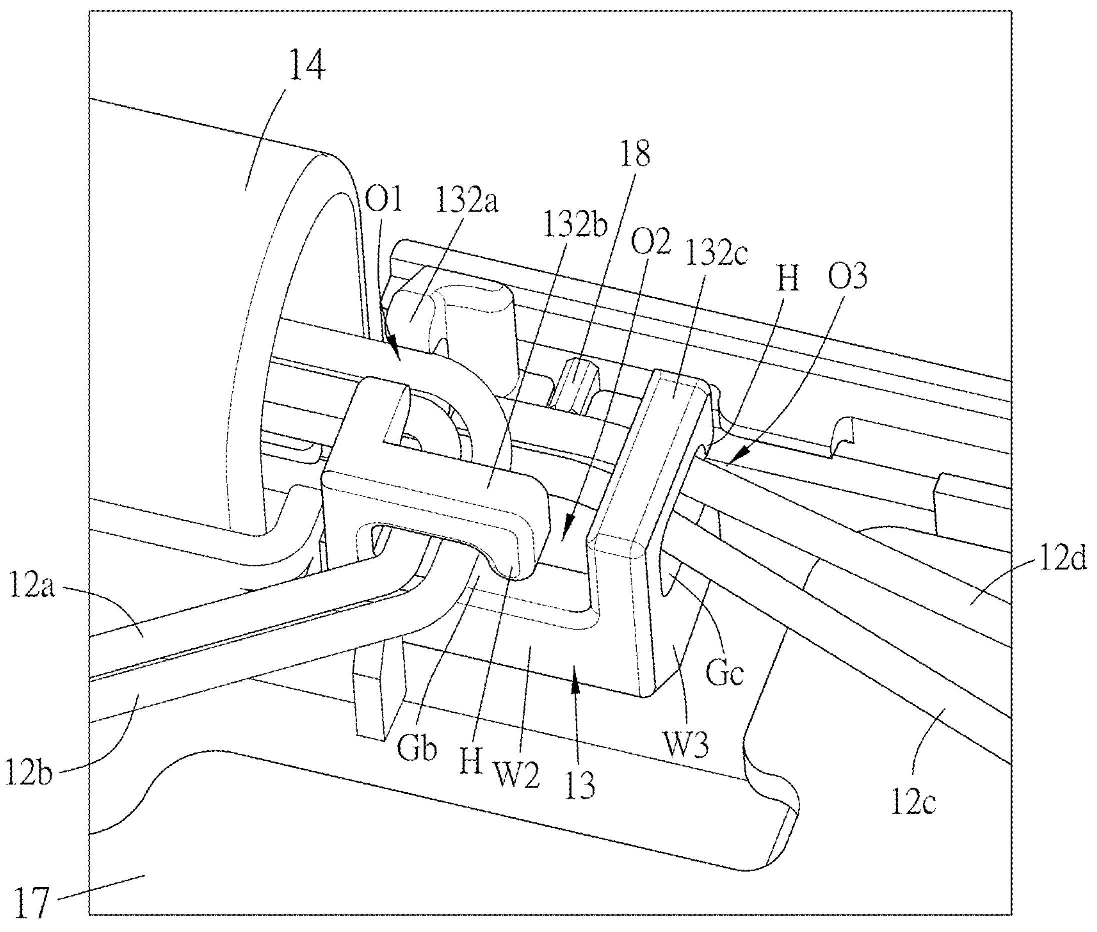
FIG. 3C is a schematic diagram showing that the wire management structure of FIG. 2A is used to manage the wires inside the electronic device.

FIG. 1A is a schematic diagram showing a partial internal structure of an electronic device, and FIG. 1B is an enlarged view of the region A as shown in FIG. 1A. FIG. 2A and FIG. 2B are schematic diagrams showing the wire management structure according to an embodiment of this disclosure in different viewing angles. FIG. 3A is a schematic diagram showing a partial internal structure of an electronic device according to an embodiment of this disclosure. FIG. 3B is a schematic diagram showing that the wire management structure of FIG. 2A is disposed inside the electronic device, and FIG. 3C is a schematic diagram showing that the wire management structure of FIG. 2A is used to manage the wires inside the electronic device.

Referring to FIGS. 1A and 1B, the electronic device 9 may be a notebook computer and include a hinge structure 91 for connecting a host part 95 and a display part (not shown), so that the host part 95 and the display part can be pivotally connected to each other and relatively rotated via the hinge structure 91. In addition, the internal of the electronic device 9 includes a plurality of wires 92 for signal transmission between the host part 95 and the display part. These wires 92 pass through the hinge structure 91 and include, for example but not limited to, the signal transmission wires or cables of Wifi, 4G LTE and/or 5G antennas.

Since the current electronic device 9 (e.g. notebook computer) is designed thinner, the internal space of the host part 95 is extremely limited. Moreover, the housing 93 (i.e., keyboard frame) of the host part 95 includes the hook 94 for assembling the upper case and the lower case of the housing 93. Therefore, the mold for manufacturing the housing 93 cannot extend over the front end of the hook 94, so it is difficult to organize the structure for managing the wires 92 through the same mold. Thus, the present disclosure designs a wire management structure being capable of combining with the housing of the host part 95 to organize the wires 92. The wire management structure can not only avoid crossing and stacking of wires or incorrect wire management, but also comply with safety regulations.

As shown in FIGS. 2A to 3C, the electronic device 1 of this embodiment comprises a housing 11, a plurality of wires and a wire management structure 13. The wire management structure 13 is disposed at the housing 11 and is used to fix the wires. The material of the housing 11 may include, for example but not limited to, plastic material, magnesium alloy, aluminum metal, or any combination thereof, and this disclosure is not limited thereto.

Referring to FIG. 3A, the housing 11 may be the upper housing (i.e., keyboard frame) of the host part 15 of the electronic device 1. The lower side of the housing 11 may be configured with multiple holes, so that parts of multiple buttons provided in the host part 15 can pass through and protrude from these holes, and the user may press the buttons protruded from the holes. To be noted, in addition to the buttons, the host part 15 can further contain a control circuit board 17, a memory, an I/O unit, a control circuits, a control component, accessories, or the likes. The buttons, control circuit board, memory, I/O unit, control circuit, control component or accessories are not the technical features of this disclosure, so the detailed descriptions thereof will be omitted.

In this embodiment, the electronic device 1 includes, for example, four wires 12*a* to 12*d*. Herein, the wires 12*a* and 12*b* can be signal transmission wires used in, for example but not limited to, WWAN (Wireless Wide Area Network) (e.g. 4G LTE and/or 5G mobile networks), and the wires 12*c* and 12*d* can be signal transmission wires used in, for example but not limited to, Wifi communication. In different embodiments, the electronic device 1 may include two, four or more (e.g. six) wires, which depends on the design of the electronic device 1. In addition, the electronic device 1 of this embodiment may further include a hinge structure 14 connected to the housing 11. The hinge structure 14 is used for pivotally connecting the host part 15 to the display part 16, so that the host part 15 and the display part 16 can relatively rotate with each other. The wire management structure 13 is disposed on the housing 11 and is adjacent to the hinge structure 14. The wires 12*a* to 12*d* pass through the hinge structure 14, and are arranged and fixed in position by the wire management structure 13.

The wire management structure 13 is used to fix the wires 12*a* to 12*d* and includes a main body 131 and a plurality of guide members 132*a*, 132*b* and 132*c*. The material of the wire management structure 13 may include plastic material, metal or rubber, and this disclosure is not limited thereto. In one embodiment, the material of the wire management structure 13 includes plastic material, and the wire management structure 13 is manufactured by injection molding.

The main body 131 is disposed at the housing 11 and includes a first side wall W1, a second side wall W2 and a third side wall W3. The second side wall W2 is connected to the first side wall W1 and the third side wall W3. In this embodiment, the second side wall W2 is perpendicular to the first side wall W1 and the third side wall W3, and the first side wall W1 is located opposite to the third side wall W3. In addition, the main body 131 of this embodiment can further include a fourth side wall W4 connected to the first side wall W1 and the third side wall W3. The fourth side wall W4 is located opposite to the second side wall W2. As shown in FIG. 2B, the fourth side wall W4 has a recess U for positioning at the housing 11 of the electronic device 1. As shown in FIGS. 3B and 3C, the housing 11 may include a convex portion 18, and the recess U can be engaged with the convex portion 18 while the wire management structure 13 is disposed at the housing 11. In some embodiments, the main body 131 of the wire management structure 13 and the housing 11 can be connected by adhering, screwing, embedding, wedging, or any combination thereof. In this embodiment, for example, the bottom surface 1311 of the main body 131 is adhered for firmly fixing to the housing 11.

The guide member 132*a* is correspondingly disposed at the first side wall W1, the guide member 132*b* is correspondingly disposed at the second side wall W2, and the guide member 132*c* is correspondingly disposed at the third side wall W3. A plurality of wire management slots Ga, Gb and Gc are formed between the guide members 132*a* to 132*c* and the first side wall W1, the second side wall W2, and the third side wall W3, respectively. Specifically, the wire management slot Ga is formed between the guide member 132*a* and the first side wall W1, the wire management slot Gb is formed between the guide member 132*b* and the second side wall W2, and the wire management slot Gc is formed between the guide member 132*c* and the third side wall W3. In this case, the guide members 132*a*, 132*b* and 132*c* are connected to the first to third side walls W1 to W3 of the main body 131 so as to correspondingly and individually form the wire management slots Ga, Gb and Gc. In this way, the wire management structure 13 can be the multidirectional structure for managing wires 12*a* to 12*d*. The wires 12*a* to 12*d* are suitable to pass through and be fixed in the wire management slots Ga, Gb and Gc. In this embodiment, the main body 131 and the guide members 132*a* to 132*c* can be integrally formed as one piece. To be noted, this disclosure is not limited thereto. In different embodiments, the main body 131 and the guide members 132*a* to 132*c* can be independent components and be assembled to form the wire management structure 13, but this disclosure is not limited thereto.

Two opposite ends of each of the guide members 132*a* to 132*c* has a first end E1 and a second end E2. The first ends E1 of the guide members 132*a* to 132*c* are connected to the first to third side wall W1 to W3 of the main body 131, respectively. The management structure 13 further includes openings O1 to O3. The openings O1 to O3 are located adjacent to the second ends E2 of the guide members 132*a* to 132*c*, respectively, to individually connect to the wire management slots Ga, Gb and Gc. The wire management structure 13 further includes an extension wall W5. The extension wall W5 is connected to the first side wall W1 and the guide member 132*b*, and spaced from the guide member

132*a*. The opening O1 corresponds to the first side wall W1, is located between the second end E2 of the guide member 132*a* and one end of the extension wall W5 away from the first side wall W1 and is connected to the wire management slot Ga. The opening O2 corresponds to the second side wall W2, is located between the second end E2 of the guide member 132*b* and the adjacent guide member 132*c*, and is connected to the wire management slot Gb. The third opening O3 is located between the second end E2 of the guide member 132*c* and the third side wall W3 and connected to the wire management slot Gc. Furthermore, the opening direction of the opening O1 is the same as the opening direction of the opening O2 and is perpendicular to the opening direction of the opening O3. In the embodiment, the opening directions of the openings O1 and O2 are upward, and the opening direction of the opening O3 is toward the side. Accordingly, the wires 12*a* to 12*d* can be disposed into the wire management slots Ga, Gb and Gc through the openings O1 to O3, so that the wire management slots Ga, Gb and Gc can effectively fix the wires 12*a* to 12*d* in positions.

Specifically, the wire management structure 13 of this embodiment may include one first guide member and at least one second guide member. In this case, the guide members 132*a* may be regarded as one first guide member, the guide members 132*b* and 132*c* may be regarded as the second guide member. The shapes of the guide members 132*b* and 132*c* are the same, but the shape of the guide member 132*a* is different from the shapes of the guide members 132*b* and 132*c*. In different embodiments, the shapes of the guide members 132*b* and 132*c* may be different. In addition, the first ends E1 of the guide members 132*b* and 132*c* are respectively connected to the main body 131, and the second ends E2 of the guide members 132*b* and 132*c* are respectively configured with hook structures H. A distance d defined between the hook structure H and the main body 131 in a normal direction of the main body 131 is less than 1 mm ($d<1$ mm), so that the electronic device 1 can comply with safety regulations.

In addition, the wire management structure 13 may include one first wire management slot and at least one second wire management slot. In this case, the wire management slot Ga may be regarded as one first wire management slot, and the wire management slots Gb and Gc may be regarded as two second wire management slots. The wire management slot Ga is located among the guide member 132*a*, the extension wall W5 and the first side wall W1, and the shape of the wire management slot Ga may be square or round. The wire management slot Gb is located between the guide member 132*b* and the second side wall W2, and the wire management slot Gc is located between the guide member 132*c* and the third side wall W3. The shapes of the wire management slots Gb and Gc may be a long and narrow shape. In other words, the wire management slot Ga is configured between the guide member 132*a* and the main body 131, and two wire management slots Gb and Gc are correspondingly configured between the guide members 132*b* and 132*c* and the main body 131. The wire management slot Ga is larger than the wire management slot Gb or Gc. Based on the above-mentioned design, as shown in FIG. 3C, the wires 12*a* to 12*d* passing through the hinge structure 14 can enter the wire management structure 13 through the larger wire management slot Ga. Subsequently, two wires 12*a* and 12*b* can exit from the smaller wire management slot Gb, the other two wires 12*c* and 12*d* can exit from the smaller wire management slot Gc.

As mentioned above, the wire management structure 13 complying with safety regulations is designed inside the host part 15 with the narrow space of the electronic device 1 to regulate the positions of the internal wires 12*a* to 12*d*. The configuration of the wire management structure 13 can properly manage the wires 12*a* to 12*d* applied to, for example, Wifi, 4G LTE and/or 5G, thereby preventing these wires 12*a* to 12*d* from undesired crossing and stacking or incorrect wire management. In addition, the wire management structure 13 of this embodiment has a multi-directional structure and is attached to the housing 11 of the host part 15 of the electronic device 1 by adhesion to save the works of housing mold design or post-processing. To be understood, in different embodiments, the size of the wire management structure 13 can be designed according to the number and size of the wires 12*a* to 12*d*.

In summary, in the wire management structure and the electronic device of this disclosure, the main body of the wire management structure is disposed at the housing of the electronic device and includes a first side wall, a second side wall and a third side wall. The guide members are correspondingly disposed at the first side wall, the second side wall and the third side wall of the main body, respectively. Therefore, a plurality of wire management slots can be formed between the guide members and the first side wall, the second side wall and the third side wall, respectively, and the wires are suitable to pass through the wire management slots. Based on the structural design, the wire management structure and electronic device of this disclosure can prevent the undesired crossing and stacking of internal wires or incorrect wire management, and comply with safety regulations.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A wire management structure suitable to fix a plurality of wires, comprising: a main body comprising a first side wall, a second side wall and a third side wall, wherein the second side wall is connected to the first side wall and the third side wall; and a plurality of guide members correspondingly disposed at the first side wall, the second side wall and the third side wall of the main body, wherein a plurality of wire management slots are formed between the guide members and the first side wall, the second side wall and the third side wall, respectively, and the wires are suitable to pass through the wire management slots; wherein each of the guide members comprises a first end and a second end, the first end of each of the guide members is connected to the main body, the management structure further comprises openings, and the openings are respectively located adjacent to the second ends of the guide members to individually connect to the wire management slots.

2. The wire management structure of claim 1, wherein the main body and the guide members are integrally formed as one piece.

3. The wire management structure of claim 1, wherein a material of the main body and the guide members comprises plastic material, metal or rubber.

4. The wire management structure of claim 1, wherein the second side wall is perpendicular to the first side wall and the third side wall, and the first side wall is located opposite to the third side wall.

5. The wire management structure of claim 1, wherein the guide members comprise a first guide member and a second guide member, and a shape of the first guide member is different from a shape of the second guide member.

6. The wire management structure of claim 5, wherein the first end of the second guide member is connected to the main body, the second end of the second guide member is configured with a hook structure, and a distance defined between the hook structure and the main body in a normal direction of the main body is less than 1 mm.

7. The wire management structure of claim 5, wherein the wire management slots comprises a first wire management slot and a second wire management slot, the first wire management slot is located between the first guide member and the first side wall, the second wire management slot is located between the second guide member and the second side wall, and an accommodation space of the first wire management slot is greater than an accommodation space of the second wire management slot.

8. An electronic device, comprising: a housing; a plurality of wires; and a wire management structure configured to fix the wires, wherein the wire management structure comprises: a main body disposed at the housing and comprising a first side wall, a second side wall and a third side wall, wherein the second side wall is connected to the first side wall and the third side wall, and a plurality of guide members correspondingly disposed at the first side wall, the second side wall and the third side wall of the main body, wherein a plurality of wire management slots are formed between the guide members and the first side wall, the second side wall and the third side wall, respectively, and the wires are suitable to pass through the wire management slots; wherein each of the guide members comprises a first end and a second end, the first end of each of the guide members is connected to the main body, the management structure further comprises openings, and the openings are respectively located adjacent to the second ends of the guide members to individually connect to the wire management slots.

9. The electronic device of claim 8, further comprising:

a hinge structure connected to the housing, wherein the wire management structure is located adjacent to the hinge structure.

10. The electronic device of claim 9, wherein the wires pass through the hinge structure and are fixed by the wire management structure.

11. The electronic device of claim 8, wherein the main body and the guide members are integrally formed as one piece.

12. The electronic device of claim 8, wherein the main body and the housing are connected by adhering, screwing, embedding, or wedging.

13. The electronic device of claim 8, wherein a material of the main body and the guide members comprises plastic material, metal or rubber.

14. The electronic device of claim 8, wherein the second side wall is perpendicular to the first side wall and the third side wall, and the first side wall is located opposite to the third side wall.

15. The electronic device of claim 1, wherein the guide members comprise a first guide member and a second guide member, and a shape of the first guide member is different from a shape of the second guide member.

16. The electronic device of claim 15, wherein the first end of the second guide member is connected to the main body, the second end of the second guide member is configured with a hook structure, and a distance defined between the hook structure and the main body in a normal direction of the main body is less than 1 mm.

17. The electronic device of claim 15, wherein the wire management slots comprises a first wire management slot and a second wire management slot, the first wire management slot is located between the first guide member and the first side wall, the second wire management slot is located between the second guide member and the second side wall, and an accommodation space of the first wire management slot is greater than an accommodation space of the second wire management slot.

* * * * *